No. 756,138. PATENTED MAR. 29, 1904.
A. A. PETERSEN.
TOOTH BRUSH ATTACHMENT.
APPLICATION FILED SEPT. 24, 1903.
NO MODEL.
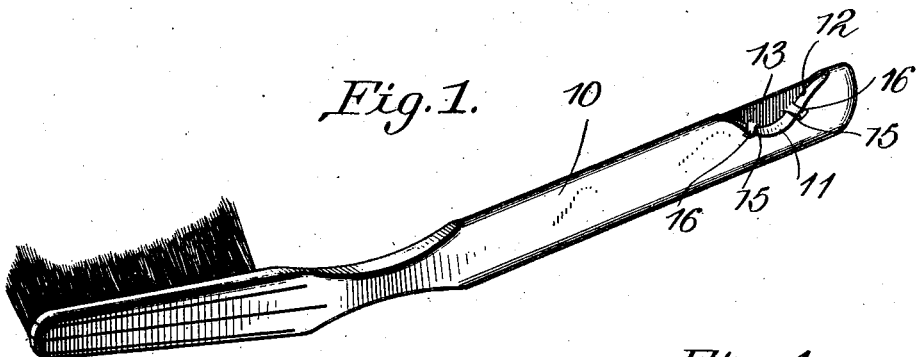
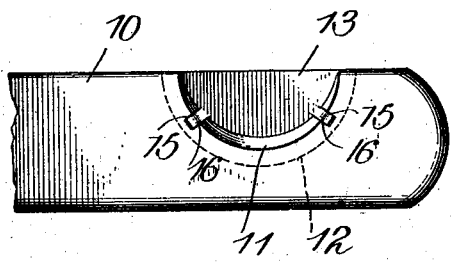
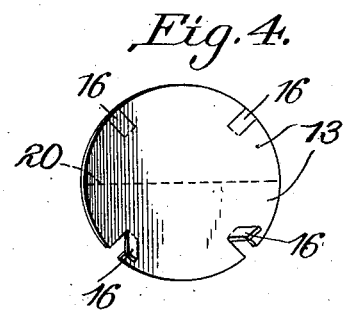
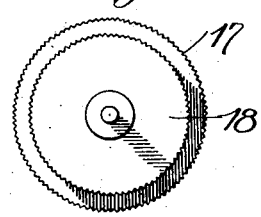
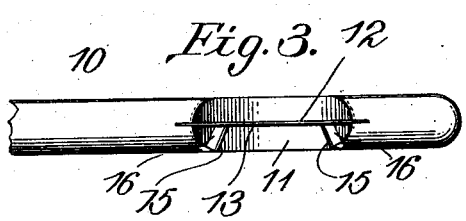
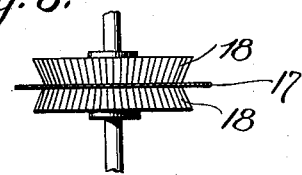

No. 756,138. Patented March 29, 1904.

UNITED STATES PATENT OFFICE.

ARNOLD A. PETERSEN, OF MUSCATINE, IOWA.

TOOTH-BRUSH ATTACHMENT.

SPECIFICATION forming part of Letters Patent No. 756,138, dated March 29, 1904.

Application filed September 24, 1903. Serial No. 174,508. (No model.)

*To all whom it may concern:*

Be it known that I, ARNOLD A. PETERSEN, a citizen of the United States, residing at Muscatine, in the county of Muscatine and State of Iowa, have invented a new and useful Tooth-Brush Attachment, of which the following is a specification.

This invention relates to devices or implements for the treatment of the teeth and for similar purposes, and has for its object to provide a plate-like attachment, preferably to the handle of a tooth-brush, whereby the small or contracted interstices between the teeth may be cleansed and the deposit or accumulation of foreign matter prevented; and the invention consists in certain novel features of construction, as hereinafter shown and described, and specified in the claims.

In the drawings illustrative of the invention, in which corresponding parts are denoted by like designating characters, Figure 1 is a perspective view of a tooth-brush with the improved device attached to the handle thereof. Fig. 2 is a side elevation, and Fig. 3 is a plan view, enlarged, of the end of the handle member with the improvement applied. Fig. 4 is a perspective view of one of the "blanks" from which the plates are constructed. Figs. 5 and 6 are views of the saw and cutting-wheel, whereby the plate-holding cavity and recess are formed in the supporting member.

The improved device will preferably be attached to the handle 10 of a tooth-brush, and in applying the device a recess 11, preferably semicircular in shape, is formed transversely in the handle and preferably near the outer end and with reversely-inclined sides, as shown. A connecting recess 12 is formed longitudinally of the member 10 and extending through the recess 11 and forming an extension therefrom. A relatively thin metal plate 13 is inserted in the recess 12 and extends across the recess 11 with its outer free edge in longitudinal alinement with the member 10, as shown.

The recess 11 is formed with spaced lateral cavities 15 in one of its inclined sides, and the plate 13 is provided with spaced radial clefts, whereby tongue-like portions 16 are released, which are adapted when bent off from the plate to enter the cavities 15 and the plate firmly supported thereby, the tongues being forced into the recesses by any suitable implement.

The longitudinal recess 12 is formed with a very thin saw, so that a correspondingly thin plate may be employed, which is an essential requirement in a device of the character of the improvement herein described, as the interstices between the teeth which are to be reached thereby are frequently very contracted.

The plate 13 will generally be forced into the cavity 12 and held by friction only, but may be cemented, riveted, or otherwise secured therein, if required, and is further secured and supported, as above noted, by the bracing action of the tongue 16.

The lateral projections 16 greatly strengthen and support the plate 13 and materially assist in sustaining it in place relative to the holding member 10.

In Figs. 5 and 6 the cutting implement whereby the connecting recesses 11 and 12 are formed is represented, consisting of a thin saw 17 for the portion 12 and laterally-disposed cutting-wheels 18 19 to form the portion 11, which may thus both be formed at the same time and at one operation, thus greatly simplifying the action.

In Fig. 4 one of the preferred forms of blanks from which the plates 13 are formed is shown, consisting of a circular disk in which the clefts for the tongue-like portions 16 are formed, and when severed centrally along the line 20 will form two of the plates. This greatly simplifies and cheapens the construction and greatly improves the structure and renders it an easy matter to replace worn or broken plates, as the recesses and plates are thus constructed uniformly and of exactly the same form and size in all the various brush-handles or other supporting member employed.

By this simple means the narrow and contracted interstices between the teeth, which the ordinary brushes or similar implements cannot reach, can be very quickly cleansed and freed from adhering particles of foreign matter or deposits or growth, and the teeth preserved and decay arrested or entirely prevented, and being located in the brush-handle are in the most convenient position for use.

The plates 13 will preferably be of hardened steel, and may be of any required thickness and strength, and will preferably be as thin as possible consistent with the strains to which they will be subjected.

Having thus described the invention, what I claim is—

1. In an implement of the character described, a supporting member having a transverse recess with an intermediate lateral recess extending therefrom into the body of the supporting member, and a relatively thin plate-like member supported in said lateral recess and extending across said transverse recess, substantially as specified.

2. In an implement of the character described, a supporting member having a transverse recess with an intermediate lateral recess extending therefrom into the body of the supporting member, and a relatively thin plate-like member having spaced radial clefts, whereby tongue-like portions are released, said plate-like member being supported in said lateral recess with said tongue-like portions in engagement with the walls of the transverse recess, substantially as specified.

3. In an implement of the character described, a supporting member having a transverse recess with spaced lateral cavities and with an intermediate recess extending from said transverse recess longitudinally of the supporting member, and a relatively thin plate-like member adapted for engagement with said longitudinal recess and extending across said transverse recess and provided with lateral tongue-like projections engaging said spaced lateral recesses, substantially as specified.

In testimony that I claim the foregoing as my own I have hereto affixed my signature in the presence of two witnesses.

ARNOLD A. PETERSEN.

Witnesses:
ED. P. INGHAM,
J. J. COADY.